United States Patent [19]
De Vriendt et al.

[11] Patent Number: 6,163,547
[45] Date of Patent: Dec. 19, 2000

[54] IN-BAND SIGNALING FOR A HAND-OVER OPERATION IN A MOBILE TELECOMMUNICATION SYSTEM

[75] Inventors: Johan André De Vriendt, Drongen; Abdelkrime Saidi, Brussels, both of Belgium; Marco Johannes Peters, Ns Bergen Op Zoom, Netherlands

[73] Assignee: Alcatel, Paris, France

[21] Appl. No.: 09/020,973

[22] Filed: Feb. 9, 1998

[30] Foreign Application Priority Data

Feb. 17, 1997 [EP] European Pat. Off. ............... 97400353

[51] Int. Cl.[7] ........................................................ H04J 3/16
[52] U.S. Cl. .......................... 370/466; 370/469; 370/471
[58] Field of Search ..................................... 370/466, 469, 370/471, 474, 476, 419, 420, 400

[56] References Cited

U.S. PATENT DOCUMENTS

| 5,878,045 | 3/1999 | Timbs ..................................... 370/466 |
| 5,889,773 | 3/1999 | Stevenson, III ......................... 370/474 |

OTHER PUBLICATIONS

1996 IEEE International Conference on Communications (ICC) Converging Technologies for Tomorrow's Applciations, Dallas, Jun. 23–27, 1996. "A Signaling and control Architecture for Mobility Support in Wireless ATM Networks" pp. 478–484.

1996 IEEE International Conference on Communications (ICC) Converging Tech. for Tomorrow's Applications, Dallas, Jun. 23–27, 1996, "Layered Cell Structure for Mobile ATM Networks" pp. 1254–1257.

IEEE Journal on Selected Areas in Communications, vol. 15, No. 1 Jan. 1996, "Watmnet: A Prototype Wireless ATM System for Multimedia Personal Communications", p. 85.

*Primary Examiner*—Chi H. Pham
*Assistant Examiner*—Brenda H. Pham
*Attorney, Agent, or Firm*—Milton Oliver; Ware, Fressola, Van Der Sluys & Adolphson, LLP

[57] ABSTRACT

A mobile telecommunication system with Base Transceiver Stations (BTS1–3) coupled to a mobile terminal (MT) via a radio link and exchanging mobile information (AAL-SDU: MUD, MSI) with a telecommunication controller (TC: BSC1–2; MSC). The mobile information contains a telecommunication signaling, such as a hand-over command (HOCOM), e.g. to be transported to the telecommunication controller. According to the ITU recommendation for the ATM Adaptation Layer AAL of the type 2 or 5, the AAL-PDU packets, which may for instance be transported by ATM cells, and wherein the mobile information is mapped, include a User-to-User indication field CPS-UUI or CPCS-UU, respectively, that transparently transports user data. This field is used to transport the telecommunication signaling in the up-link connection to a Base Station Controller (BSC1–2) or to a Mobile Services switching center (MSC), or, in the down-link connection, to base transceiver station (BTS1–3). The circuit (SARS1–2) which extracts this telecommunication signaling is relatively simple since the location of this signaling in the packet is well known because it corresponds to the location of the user-to-user indication field. There is thus no need, for the circuit (SARS1–2) receiving a packet, to search for the telecommunication signaling in the whole packet received.

16 Claims, 3 Drawing Sheets

IN-BAND SIGNALING FOR A HAND-OVER OPERATION IN A MOBILE TELECOMMUNICATION SYSTEM

TECHNICAL FIELD

The present invention relates to a mobile telecommunication system including at least one transceiver station coupled to a mobile terminal via a radio link and adapted to exchange mobile information with a telecommunication controller, said mobile information including a predetermined telecommunication signaling to be transported to said telecommunication controller, said transceiver station including first mapping and loading means adapted to map said mobile information into first packets and to load said first packets into second packets to be transmitted to said telecommunication controller, and said telecommunication controller including second mapping and loading means adapted to unload said first packets from said second packets.

BACKGROUND OF THE INVENTION

Such a telecommunication system is already known in the art and the mapping of the mobile information in the first packets is standardized, e.g. by recommendations of authorities such as the European Telecommunications Standards Institute ETSI or the Telecommunication Standardization Sector ITU-T of the International Telecommunication Union ITU (previously the International Telegraph and Telephone Consultative Committee or Comité Consultatif International Téléphonique et Télégraphique CCITT). These international authorities specify, amongst other, the size, the structure, the contents and the transmission protocol of such first packets.

A possible problem with this known telecommunication system is that the second mapping and loading means of the telecommunication controller receiving the second packet has to localize the predetermined telecommunication signaling within the first packet unloaded from the second packet. Such a procedure may be time consuming and requires relatively complex searching circuits.

SUMMARY OF THE INVENTION

An object of the present invention is to provide a telecommunication system of the above known type but wherein it is easy, for the second mapping and loading means of the telecommunication controller receiving the second packet, to localize the predetermined telecommunication signaling received therein, thereby reducing the complexity of the system. Another object of the invention is to reduce the number of bits mapped into the first packet with respect to the number of bits of the mobile information to be transported in order to be able to reduce the number of second packets to be exchanged between the transceiver station and the telecommunication controller.

According to the invention, this object is achieved due to the fact that each of said first packets comprises a payload and a control part, that said first mapping and loading means of said transceiver station is adapted to map said predetermined telecommunication signaling into a predetermined field of the control part of said first packets and to map the remainder of said mobile information into the payload of said first packets, and that said second mapping and loading means of said telecommunication controller is adapted to extract said predetermined telecommunication signaling from said predetermined field of the control part of said first packets.

In this way, there is no longer need to search for the predetermined telecommunication signaling in the first packet because it can immediately be extracted from the predetermined field of which the location is well known. The operation speed of the system is thereby also improved. Furthermore, since the predetermined telecommunication signaling is removed from the mobile information mapped in the payload of the first packets, the length, or number of bits, used in its payload is shorter than the length of the mobile information.

In a particular application of the present invention, said mobile telecommunication system includes a second transceiver station coupled to said mobile terminal via a radio link and adapted to exchange mobile information with said telecommunication controller, said predetermined telecommunication signaling is a hand-over command, for said mobile terminal, from said one transceiver station to said second transceiver station, and said telecommunication controller includes transfer means coupled to said second mapping and loading means and adapted, upon reception of said hand-over command, to replace an exchange of second packets with the first mentioned transceiver station by an exchange of second packets with said second transceiver station.

In this way, the hand-over operation is performed as a result of an in-band signaling with respect to the packets used in the mobile telecommunication system.

Another characteristic feature of the present invention is that said second mapping and loading means of said telecommunication controller are further adopted to extract said mobile information from said first packets.

The mobile information may then be processed by the telecommunication system.

The present invention also relates to a mobile telecommunication system including at least one transceiver station coupled to a mobile terminal via a radio link and adapted to exchange mobile information with a telecommunication controller, said mobile information including a predetermined telecommunication signaling to be transported to said transceiver station, said transceiver station including first mapping and loading means adapted to extract said mobile information from first packets unloaded from second packets received from said telecommunication controller, and said telecommunication controller including second mapping and loading means adapted to map said mobile information into said first packets and to load said first packets into second packets to be transmitted to said transceiver station.

The same problem as mentioned above in relation with the detection or localization of the predetermined telecommunication signaling by the telecommunication controller is here applicable to the transceiver station.

The present invention solves that problem owing to the fact that each of said first packets comprises a payload and a control part, that said first mapping and loading means of said transceiver station is adapted to extract said predetermined telecommunication signaling from a predetermined field of the control part of said first packets, and that said second mapping and loading means of said telecommunication controller is adapted to map said predetermined telecommunication signaling into said predetermined field of the control part of said first packets and to map the remainder of said mobile information into the payload of said first packets.

In this way, the above advantage of an easy localization of the predetermined telecommunication signaling in the up-link connection from the transceiver station to the telecommunication controller is now also possible in the downlink connection.

In a preferred embodiment, each of said second packets is an Asynchronous Transfer Mode [ATM] packet that comprises a payload and a control part, and said first packets are loaded into and unloaded from said payload of said second packets.

Preferably, said first packets have a structure defined in a recommendation such as the ATM Adaptation Layer [AAL2; AAL5] recommendation "1.363" of the Telecommunication Standardization Sector "ITU-T" of the International Telecommunication Union "ITU", the predetermined field being the User-to-User indication field defined in the control part of said first packets.

The telecommunication system of the present invention thus operates fully in line with this recommendation of the above mentioned international authorities since it is mentioned therein that the contents of the User-to-User indication field is transparently transported by the corresponding packets.

In more detail, said mobile information comprises mobile user data and mobile signaling information, and said predetermined telecommunication signaling forms part of said mobile signaling information.

In a particular embodiment of the present telecommunication system, said telecommunication controller includes at least one base station controller interconnected with a mobile services switching center, and said base station controller is coupled to said first and second transceiver station and includes said second mapping and loading means and said transfer means.

An additional possibility is that said telecommunication controller includes at least a first and a second base station controllers interconnected with a mobile services switching center, that said first transceiver station is coupled to said first base station controller, that said second transceiver station is coupled to said second base station controller, and that said mobile services switching center includes said transfer means.

It is to be noted that the last two embodiments may both be present in a telecommunication system.

The present invention further also relates to a method for exchanging, in a mobile telecommunication system, mobile information from a transceiver station, coupled to a mobile terminal via a radio link, to a telecommunication controller, said mobile information including a predetermined telecommunication signaling to be transported to said telecommunication controller, said method including the steps of mapping said mobile information into first packets and of loading said first packets into second packets transmitted from said transceiver station to said telecommunication controller, said method further including the step of unloading said first packets from said second packets received by said telecommunication controller.

The invention is characterized in that each of said first packets comprises a payload and a control part, in that said method comprises the steps of mapping said predetermined telecommunication signaling into a predetermined field of the control part of said first packets and to map the remainder of said mobile information into the payload of said first packets prior to loading said first packets into second packets, and in that said method further comprises the steps of extracting said predetermined telecommunication signaling from said predetermined field of the control part of said first packets unloaded from said second packets.

The present method is applicable to the above telecommunication system and allows to have all the advantages thereof.

Further characteristic features of the present telecommunication system and method are mentioned in the appended claims.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
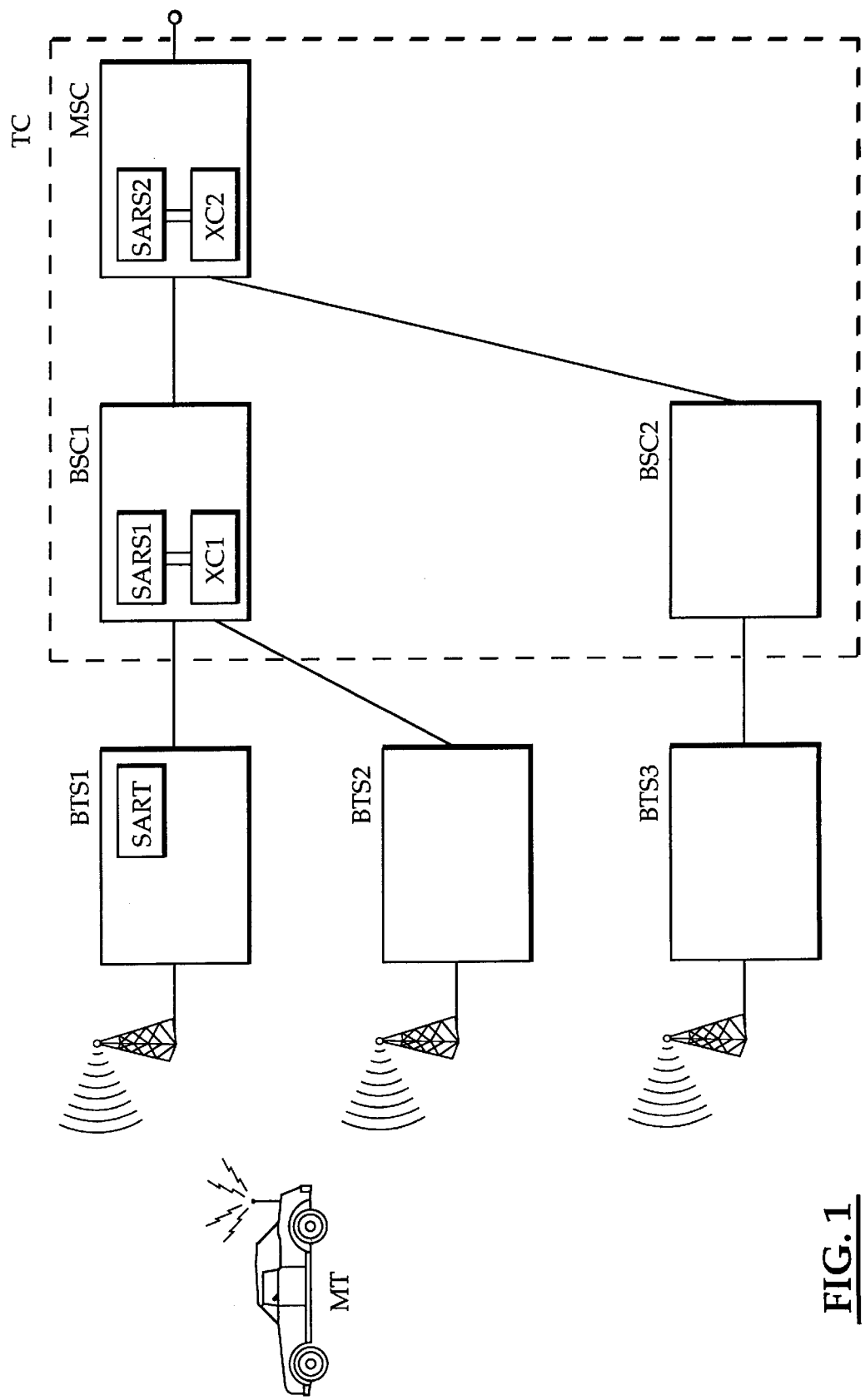
FIG. 1 shows a telecommunication system according to the invention.

The telecommunication system shown in FIG. 1 is of the type Global System for Mobile communication [GSM] and includes Base Transceiver Stations as BTS1, BTS2 and BTS3 which can communicate, via a radio link, with a mobile terminal MT that may for instance be an hand-set or a car-phone. In the example shown, the two base transceiver stations BTS1 and BTS2 are linked to the same Base Station Controller BSC1, whilst the base transceiver station BTS3 is linked to a second base station controller BSC2. The two base station controllers BSC1 and BSC2 are further linked to a Mobile Services switching Center MSC that is itself connected to other telecommunication devices which are not shown nor described here because they are not necessary for understanding the scope of the invention. The array including the base station controllers BSC1-2 and the mobile services switching center MSC is generally referred to as a telecommunication controller TC.

The links between the base transceiver stations BTS1-3 and the base station controllers BSC1-2, as well as the links between these base station controllers BSC1-2 and the mobile services switching center MSC are adapted to transmit telecommunication packets, preferably Asynchronous Transfer Mode [ATM] packets, hereafter called ATM cells. The transport of data and services over these ATM links is defined by recommendations of authorities such as the International Telecommunication Union [ITU]. In the present example, we will consider packet transport according to an ATM Adaptation Layer AAL of the type 2 [AAL2] and of the type 5 [AAL5], respectively defined by recommendations 1.363.2 (draft-11/96) and 1.363 (03/93) of the Telecommunication Standardization Sector [ITU-T] of the ITU.

Details about ATM and the AAL layers may for instance be found in the book "ASYNCHRONOUS TRANSFER MODE—Solution for Broadband ISDN" of M. De Prycker, published in 1993 by "Ellis Horwood Limited", England.

Figure 2:
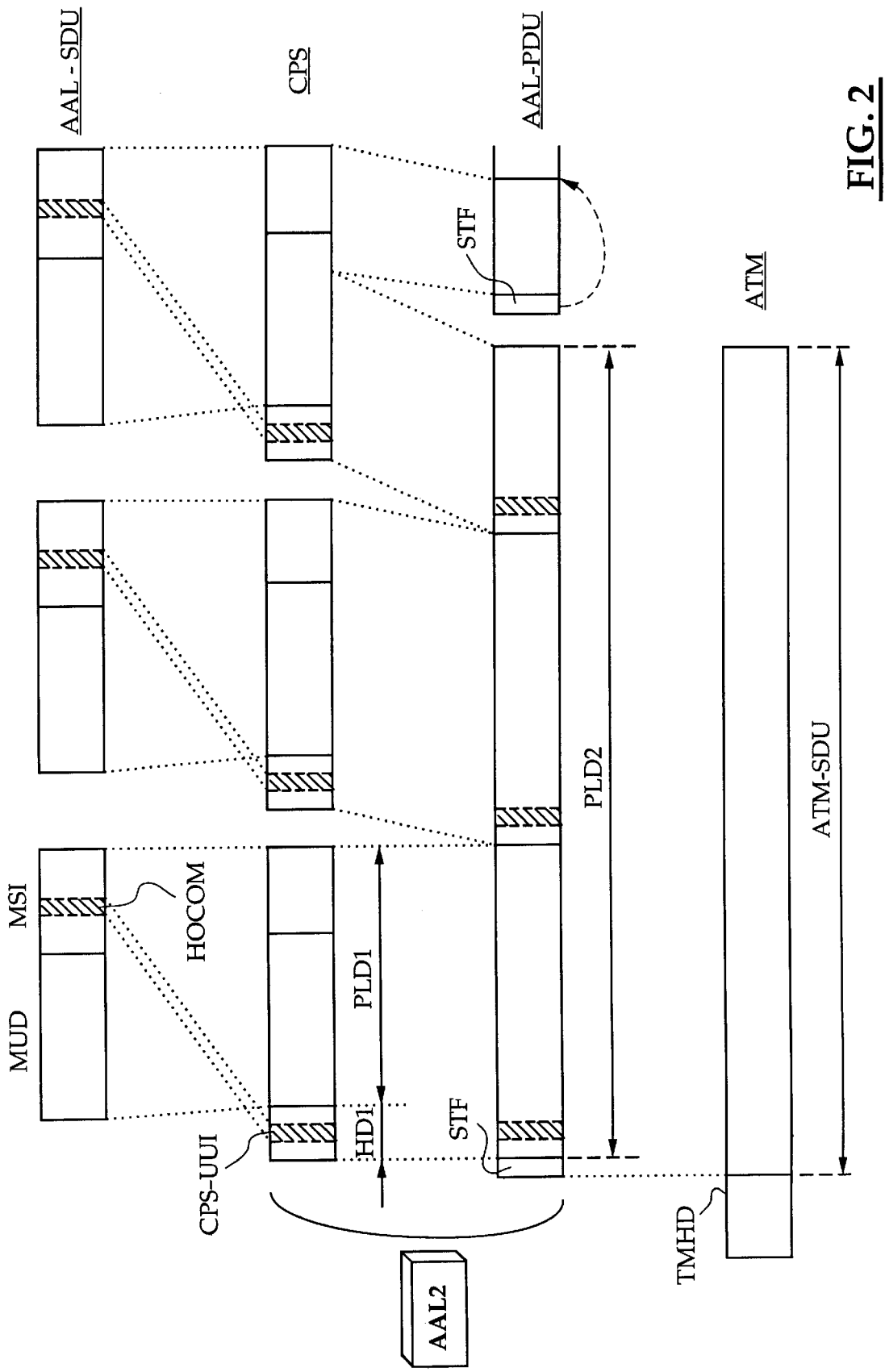
FIGS. 2 and 3 represent telecommunication packets used in the telecommunication system of FIG. 1.
Figure 3:
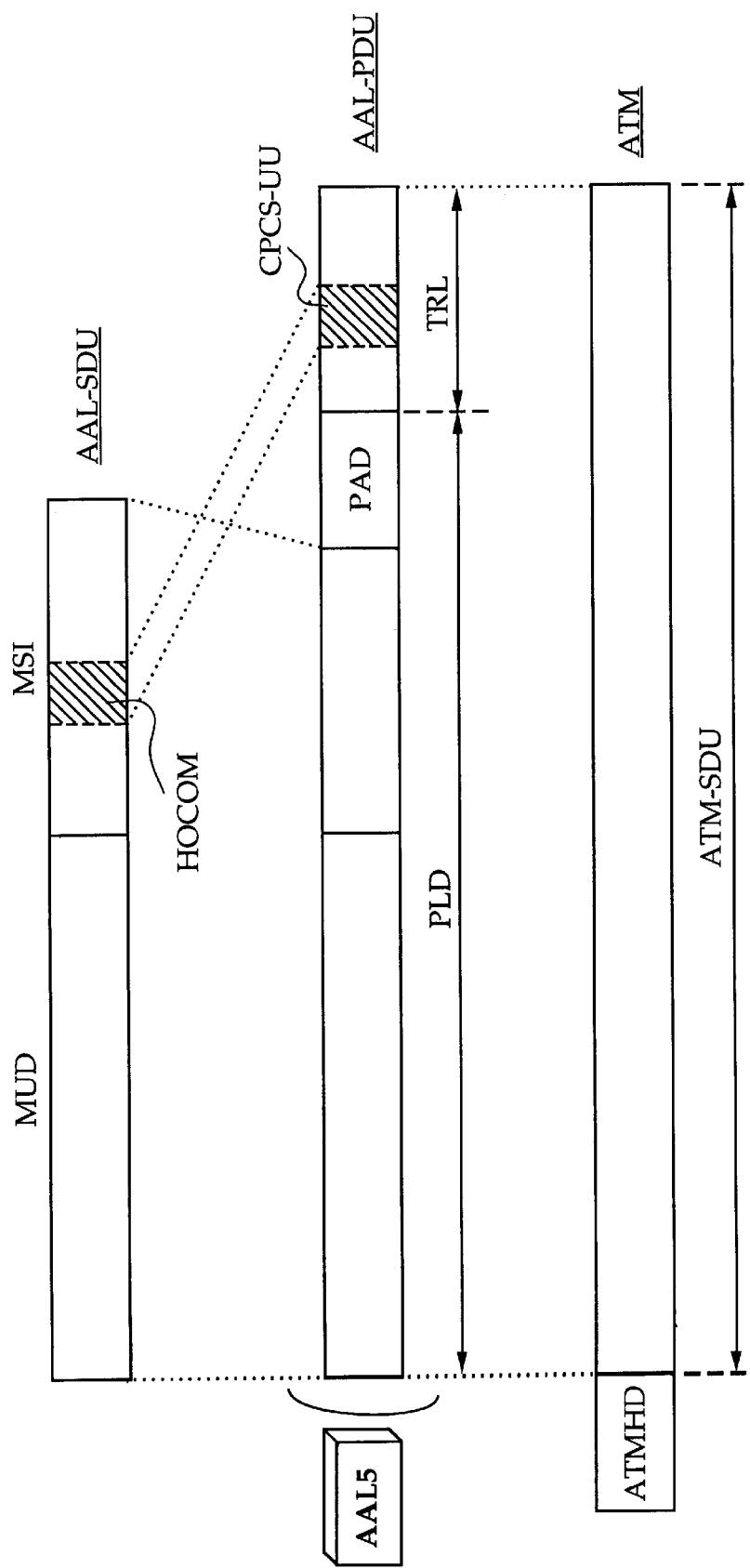

Mobile information relating to the communication with the mobile terminal MT is arranged in AAL-SDU packets (SDU =Service Data Unit), as shown in the FIGS. 2 and 3, that are delivered to the AAL2 or AAL5 layer. The mobile information in an AAL-SDU packet includes Mobile User Data MUD and Mobile Signaling Information MSI. The AAL then maps this mobile information into AAL-PDU packets (PDU=Protocol Data Unit), and these AAL-PDU packets are loaded in the information field or payload ATM-SDU of ATM cells, and vice versa. Each ATM cell comprises a header ATMHD of 5 bytes and a payload ATM-SDU of 48 bytes, which is also the total length of an AAL-PDU packet.

The mapping of the mobile information MUD and MSI from the AAL-SDU packets into the AAL-PDU packets and the loading of these packets in the ATM cells is performed by a mapping and loading circuit SART (FIG. 1) located in the base transceiver stations BTS1–3, whilst the reverse operation of unloading the AAL-PDU packets from the ATM cells and extracting the mobile information therefrom is performed by a similar mapping and loading circuit located in the telecommunication controller TC. In more detail, both the base station controllers BSC1–2 and the mobile services switching center MSC include a mapping and loading circuit SARS1 and SARS2 respectively. It is to be noted that this operation may be performed in the other direction by the same circuits. In other words, the mapping and loading circuit SART can not only arrange mobile information in ATM cells for an up-link connection towards the telecommunication controller TC, but can also recover mobile information from ATM cells received via a down-link connection from the telecommunication controller TC. The same is true for the mapping and loading circuit SARS1 and SARS2.

In the following part of the description, we will consider that a particular telecommunication signaling HOCOM (FIGS. 2 and 3) is included in the mobile information, and more particularly in the mobile signaling information part MSI thereof. By the way of an example, we will take an hand-over command as the particular telecommunication signaling. This hand-over command HOCOM indicates to the base station controller BSC1 or the mobile service switching center MSC receiving it, that the communication of the mobile terminal MT with a first base transceiver station, e.g. BTS1, has to be replaced by a communication with another base transceiver station, such as BTS2 or BTS3. Such a hand-over command HOCOM may for instance be an answer to a hand-over request earlier generated by the mobile terminal MT, the base transceiver station BTS1, or another part of the telecommunication controller TC. It may also be the result of a "macro-diversity" decision, wherein two base transceiver stations are communicating with the mobile terminal MT until the communication is transferred to only one of these two stations. Such a hand-over operation is also known as "soft hand-over". For executing a hand-over operation between the base transceiver stations BTS1 and BTS2, the base station controller BSC1 includes a transfer circuit XC1 coupled to the mapping and loading circuit SARS1 and adapted, upon reception of hand-over command HOCOM, to replace an exchange of ATM cells with the base transceiver station BTS1 by an exchange of ATM cells with the base transceiver station BTS2. In case of a hand-over from the base transceiver station BTS1 to the base transceiver station BTS3, the exchange is executed at the level of the mobile services switching center MSC by a transfer circuit XC2 coupled to the mapping and loading circuit SARS2. The transfer circuit XC2 operates in a similar way as the transfer circuit XC1 of the base station controller BSC1, but it is to be noted that in that case the telecommunication signaling, i.e. the hand-over command HOCOM, is transparently transported by the base station controller BSC1.

It is to be noted that, although in FIG. 1 the mapping and loading circuit SART is only shown in the base transceiver station BTS1, the other stations BTS2 and BTS3 may also include a similar circuit. The same is true for the mapping and loading circuit SARS1 and for the transfer circuit XC1 which may also be included in the base station controller BSC2 although they are only shown in the base station controller BSC1.

The mapping and loading of the mobile information MUD and MSI from the AAL-SDU packets into the ATM cells according to the above recommendations AAL2 and AAL5 will be described in more detail below by making reference to the FIGS. 2 and 3 respectively.

According to the AAL2 recommendation and referring to FIG. 2, the mobile information MUD and MSI of an AAL-SDU packet is mapped in a CPS packet, also called mini-cell (CPS=Common Part Sublayer). The CPS packet comprises a payload PLD1 and a control part, i.e. a header HD1, of 3 bytes. A 3 bit User-to-User indication field CPS-UUI is provided in this header HD1. The purpose of the CPS-UUI field is to transparently transport user data. Since the length of the above hand-over command HOCOM does generally not exceed 3 bits, the latter is mapped in the CPS-UUI field, and only the remaining part of the mobile information is mapped in the payload PLD1 of the CPS packet. This mapping is performed by a Convergence Sublayer (CS, not shown) of the mapping and loading circuit SART of a base transceiver station, e.g. BTS1. The circuit SART then groups the CPS packets by juxtaposing them near to each other and maps them into the payload PLD2 of an AAL-PDU packet. Since the CPS packets may have a variable length, the length of the payload PLD2 of the AAL-PDU packet is not always exactly equal to a sum of lengths of juxtaposed CPS packets. In that case, a CPS packet may be partially mapped into the payload PLD2 of one AAL-PDU packet, whilst the remaining part thereof will be mapped into the payload of a second AAL-PDU packet.

In case of loss of an ATM cell, CPS packets, and thus also AAL-SDU packets, can be recovered at their reception owing to the fad that each AAL-PDU packet comprises a STart Field header STF. This STF header is a pointer indicating the beginning address of the first full CPS packet in the payload of an AAL-PDU packet. This recovery operation is performed by the mapping and loading circuit SARS1 or SARS2 of the base station controller or of the mobile service switching center MSC respectively, receiving the AAL-PDU packet in an ATM cell.

The overall length of an AAL-PDU packet comprising a STF header and a payload PLD2 is of 48 bytes. It can thus exactly be loaded in the payload ATM-SDU of an ATM cell. Also this last loading operation is performed by the circuit SART, the unloading operation being performed by the circuit SARS1 or SARS2.

The transport of the hand-over command HOCOM in the control part or header of the CPS packet is called in-band signaling. The mapping of only the remainder of the mobile information into the CPS packet allows the latter to have a payload PLD1 which is shorter than the length of the mobile information to be transported.

The function of the mapping and loading circuit SARS1 or SARS2 may, in some cases, be limited to process the header HD1 and to extract the hand-over command HOCOM therefrom without unloading the contents of the payload PLD1 of the CPS packets. This is for instance the case when the packets are forwarded further in the telecommunication system.

According to the AAL5 recommendation and referring to FIG. 3, the mobile information MUD and MSI of an AAL-SDU packet is directly mapped in an AAL-PDU packet. The AAL-PDU packet comprises a the payload PLD of 40 bytes and a control part, i.e. a trailer TRL, of 8 bytes. A 1 byte User-to-User Indication field CPCS-UU is provided in this trailer TRL (CPCS=Common Part Convergence Sublayer). The purpose of the CPCS-UU field is to transparently transport user data. Only one AAL-SDU packet is mapped in an AAL-PDU packet. The above hand-over command HOCOM, forming part of the mobile signal information part MSI of the mobile information is mapped in the CPCS-UU field of the trailer TRL, and the remainder of the mobile information is mapped in the payload PLD of the AAL-PDU packet. The remaining part of the payload PLD is completed with padding bits PAD. This mapping is performed by a Segmentation And Reassembly part [SAR] of the mapping and loading circuit SART which then also loads the AAL-PDU packet in the payload ATM-SDU of an ATM packet. In case the mobile information or AAL-SDU packet is longer than 40 bytes, it will be segmented and mapped in several AAL-PDU packets.

While the principles of the invention have been described above in connection with specific apparatus, it is to be clearly understood that this description is made only by way of example and not as a limitation on the scope of the invention, as defined in the appended claims.

What is claimed is:

1. A mobile telecommunication system including at least one transceiver station (BTS1), coupled to a mobile terminal (MT) via a radio links and adapted to exchange mobile information (AAL-SDU: MUD, MSI) with a telecommunication controller (TC: SSC1–2; MSC), said mobile information including a predetermined telecommunication signalling (HOCOM) to be transported to said telecommunication controller, said transceiver station (BTS1) including first mapping and loading means (SART) adapted to map said mobile information into first packets (CPS; AAL-PDU) and to load said first packets into second packets (ATM) to be transmitted to said telecommunication controller, and said telecommunication controller (TC; BSC1–2; MSC) including second mapping and loading means (SARS1; SARS2) adapted to unload said first packets from said second packets, wherein each of said first packets (CPS; AAL-PDU) comprises a payload (PLD1; PLD) and a control part (HD1; TRL), wherein said predetermined telecommunications signalling (HOCOM) is a hand-over command, for said mobile terminal (MT). from a first transceiver station (BTS1) to a second transceiver station (BTS2, STS3), and wherein, in order to avoid having to search through said payload for said predetermined telecommunication signalling, said first mapping and holding means (SART) of said transceiver station (BTS1) is adapted to map said predetermined telecommunication signalling (HOCOM) into a predetermined field (CPS-UUI; CPCS-UU) of the control part of said first packets and to map the remainder of said mobile information (AAL-SDU; MUD, MSI) into the payload of said first packets, and said second mapping and loading means (SARS1; SARS2) of said telecommunication controller (TC; BSC1–2; MSC) is adapted to extract said predetermined telecommunication signalling (HOCOM) from said predetermined field of the control part of said first packets.

2. A mobile telecommunication system according to claim 1, wherein said second transceiver station (BTS2, BTS3) is coupled to said mobile terminal (MT) via a radio link and adapted to exchange mobile information (AAL-SDU: MUD, MSI) with said telecommunication controller (TC: BSC1–2; MSC), and wherein said telecommunication controller includes transfer means (XC1; XC2) coupled to said second mapping and loading means (SARS1; SARS2) and adapted, upon reception of said hand-over command, to replace an exchange of second packets with said first mentioned transceiver station by an exchange of second packets with said second transceiver station (BTS2, BTS3).

3. A mobile telecommunication system according to claim 1, characterized in that said second mapping and loading means (SARS1; SARS2) of said telecommunication controller (TC: BSC1–2; MSC) are further adapted to extract said mobile information (AAL-SDU: MUD, MSI) from said first packets (CPS; AAL-PDU).

4. A mobile telecommunication system including at least one transceiver station (BTS1), coupled to a mobile terminal (MT) via a radio links and adapted to exchange mobile information (AAL-SDU: MUD, MSI) with a telecommunication controller (TC: BSC1–2; MSC), said mobile information including a predetermined telecommunication signalling (HOCOM) to be transported to said telecommunication controller, said transceiver station (BTS1) including first mapping and loading means (SART) adapted to extract said mobile information from first packets (CPS; AAL-PDU) unloaded from second packets (ATM) received from said telecommunication controller, and said telecommunication controller (TC: BSC1–2; MSC) including second mapping and loading means (SARS1; SARS2) adapted to map said mobile information into said first packets and to load said first packets into second packets to be transmitted to said transceiver station, wherein each of said first packets (CPS; AAL-PDU) comprises a payload (PLD1; PLD) and a control part (HD1; TRL), wherein said predetermined telecommunications signalling (HOCOM) is a hand-over command, for said mobile terminal (MT), from a first transceiver station (BTS1) to a second transceiver station (BTS2, BTS3), and wherein, in order to avoid a need for said telecommunication controller to search through said payload for said telecommunication signalling, said first mapping and loading means (SART) of said transceiver station (BTS1) is adapted to extract said predetermined telecommunication signalling from a predetermined field (CPS-UUI; CPCS-UU) of the control part of said first packets, and said second mapping and loading means (SARS1; SARS2) of said telecommunication controller (TC: BSC1–2; MSC) is adapted to map said predetermined telecommunication signalling into said predetermined field of the control part of said first packets and to map the remainder of said mobile information (AAL-SDU: MUD, MSI) into the payload of said first packets.

5. A mobile telecommunication system according to claim 4, characterized in that each of said second packets (ATM) is an Asynchronous Transfer Mode (ATM) packet that comprises a payload (ATM-SDU) and a control part (ATMHD), and in that said first packets are loaded into and unloaded from said payload (ATM-SDU) of said second packets.

6. A mobile telecommunication system according to claim 4, characterized in that said first packets have a structure defined in a recommendation such as the ATM Adaptation Layer (AAL2; AAL5) recommendation "1.363" of the Telecommunication Standardization Sector "ITU-T" of the International Telecommunication Union "ITU", the predetermined field being the User-to-User indication field (CPS-UUI; CPCS-UU) defined in the control part of said first packets.

7. A mobile telecommunication system according to claim 4, characterized in that said mobile information (AAL-SDU: MUD, MSI) comprises mobile user data (MUD) and mobile signaling information (MSI), and in that said predetermined telecommunication signaling (HOCOM) forms part of said mobile signaling information.

8. A mobile telecommunication system according to claim 2, characterized in that said telecommunication controller (TC: BSC1–2; MSC) includes at least one base station controller (BSC1) interconnected with a mobile services switching center (MSC), and in that said base station controller (BSC1) is coupled to said first (BTS1) and second (BTS2–3) transceiver station and includes said second mapping and loading means (SARS1) and said transfer means (XC1).

9. A mobile telecommunication system according to claim 2, characterized in that said telecommunication controller (TC: BSC1–2; MSC) includes at least a first (BSC1) and a second (BSC2) base station controllers interconnected with a mobile services switching center (MSC), in that said first transceiver station (BTS1) is coupled to said first base station controller (BSC1), in that said second transceiver station (BTS2–3) is coupled to said second base station controller (BSC2), and in that said mobile services switching center includes said transfer means (XC2).

10. A method of exchanging, in a mobile telecommunication system, mobile information ( ) from a transceiver station (BTS1), coupled to a mobile terminal (MT) via a radio link, to a telecommunication controller (TC: BSC1–2; MSC), said mobile information (AAL-SDU: MUD, MSI) including a predetermined telecommunication signalling (HOCOM) to be transported to said telecommunication controller, said method including the steps of mapping said mobile information into first packets (CSP; AAL-PDU), each of said first packets having a control part (HD1; TRL) and a payload (PLD1; PLD);

loading said first packets into second packets (ATM) transmitted from said transceiver station to said telecommunication controller, and wherein said predetermined telecommunications signalling (HOCOM) is a hand-over command, for said mobile terminal (MT), from a first transceiver station (BTS1) to a second transceiver station (BTS2, BTS3), and wherein, to facilitate fast extraction of said predetermined telecommunication signalling by said telecommunication controller, said mapping steps comprises mapping said predetermined telecommunication signalling (HOCOM) into a predetermined field (CPS-UUI; CPCS-UU) of the control part of said first packets and mapping the remainder of said mobile information (AAL-SDU; MUD, MSI) into the payload of said first packets, prior to loading of said first packets into said second packets, and further comprising the step of extracting said predetermined telecommunication signalling (HOCOM) from said predetermined field of the control part of said first packets unloaded from said second packets.

11. Method according to claim 10, characterized in that said first packets have a structure defined in a recommendation such as the ATM Adaptation Layer (AAL2; AAL5) recommendation "1.363" of the Telecommunication Standardization Sector "ITU-T" of the International Telecommunication Union "ITU", the predetermined field (CPS-UUI; CPCS-UU) being the User-to-User indication field defined in the control part of said first packet.

12. Method according to claim 10, characterized in that said mobile information (AAL-SDU: MUD, MSI) comprises mobile user data (MUD) and mobile signaling information (MSI), and in that said predetermined telecommunication signaling (HOCOM) forms part of said mobile signaling information.

13. Method according to claim 10, characterized in that said predetermined telecommunication signaling (HOCOM) is an hand-over command, for said mobile terminal (MT), from said transceiver station (BTS1) to another transceiver station (BTS2–3), both said transceiver stations (BTS1; BTS2–3) being adapted to exchange mobile information (AAL-SDU: MUD, MSI) with said telecommunication controller (TC: BSC1–2; MSC), and in that said method includes the step of, upon reception of said hand-over command by said telecommunication controller, the exchange of mobile information with the first mentioned transceiver station (BTS1) is replaced by an exchange of mobile information with said other transceiver station (BTS2–3).

14. A mobile telecommunication system according to claim 1, characterized in that each of said second packets (ATM) is an Asynchronous Transfer Mode (ATM) packet that comprises a payload (ATM-SDU) and a control part (ATMHD), and in that said first packets are loaded into and unloaded from said payload (ATM-SDU) of said second packets.

15. A mobile telecommunication system according to claim 1, characterized in that said first packets have a structure defined in a recommendation such as the ATM Adaptation Layer (AAL2; AAL5) recommendation "1.363" of the Telecommunication Standardization Sector "ITU-T" of the International Telecommunication Union "ITU", the predetermined field being the User-to-User indication field (CPS-UUI; CPCS-UU) defined in the control part of said first packets.

16. A mobile telecommunication system according to claim 1, characterized in that said mobile information (AAL-SDU; MUD, MSI) comprises mobile user data (MUD) and mobile signaling information (MSI), and in that said predetermined telecommunication signaling (HOCOM) forms part of said mobile signaling information.

* * * * *

UNITED STATES PATENT AND TRADEMARK OFFICE
CERTIFICATE OF CORRECTION

PATENT NO. : 6,163,547
DATED : December 19, 2000
INVENTOR(S) : De Vriendt et al.

It is certified that error appears in the above-identified patent and that said Letters Patent is hereby corrected as shown below:

Column 7, claim 1,
Line 3, "links" should be -- link, --
Line 5, "SSCI" should be -- BSCI --
Line 23, "(MT)." should be -- (MT), --
Line 24, "STS3" should be -- BTS3 --
Line 33, "SDU;" should be -- SDU. --
Line 36, "TC;" should be -- TC: --

Column 8, claim 4,
Line 3, "links" should be -- link, --

Column 9, claim 10,
Line 27, "SDU;" should be -- SDU: --

Signed and Sealed this

First Day of January, 2002

Attest:

Attesting Officer

JAMES E. ROGAN
Director of the United States Patent and Trademark Office